US011818755B2

(12) United States Patent
Meng et al.

(10) Patent No.: US 11,818,755 B2
(45) Date of Patent: Nov. 14, 2023

(54) TIME SENSITIVE COMMUNICATION

(71) Applicant: NOKIA TECHNOLOGIES OY, Espoo (FI)

(72) Inventors: Yan Meng, Shanghai (CN); Tao Tao, Shanghai (CN); Lorenzo Galati Giordano, Dublin (IE)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/926,792

(22) PCT Filed: Jun. 15, 2020

(86) PCT No.: PCT/CN2020/096123
§ 371 (c)(1),
(2) Date: Nov. 21, 2022

(87) PCT Pub. No.: WO2021/253165
PCT Pub. Date: Dec. 23, 2021

(65) Prior Publication Data
US 2023/0135270 A1    May 4, 2023

(51) Int. Cl.
*H04W 4/00*   (2018.01)
*H04W 74/00*  (2009.01)
(Continued)

(52) U.S. Cl.
CPC ........ *H04W 74/006* (2013.01); *H04B 17/345* (2015.01); *H04W 74/0808* (2013.01)

(58) Field of Classification Search
CPC ............ H04W 74/006; H04W 74/0808; H04B 17/345
See application file for complete search history.

(56) References Cited

U.S. PATENT DOCUMENTS 8,190,160 B2 * 5/2012 Rao .................... H04W 74/002
                                                455/436
2016/0105897 A1   4/2016 Liu et al.
(Continued)

FOREIGN PATENT DOCUMENTS

CN    109155922 A    1/2019
CN    110506433 A    11/2019
CN    110958085 A    4/2020

OTHER PUBLICATIONS

International Search Report and Written Opinion dated Mar. 11, 2021 corresponding to International Patent Application No. PCT/CN2020/096123.
(Continued)

*Primary Examiner* — Siren Wei
(74) *Attorney, Agent, or Firm* — SQUIRE PATTON BOGGS (US) LLP

(57) ABSTRACT

Example embodiments of the present disclosure relate to devices, methods, apparatuses and computer readable storage media of channel coordination in the unlicensed spectrum. The method comprises receiving, at a first device and from a plurality of second devices, information about carrier sensing to be performed by the plurality of the second devices; determining a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmitting a first message indicative of the transmission pattern to the target second device. In this way, the interoperability of the TSN network device and the normal network device can be efficiently improved in an industrial automation scenario. By controlling the access/transmission of the (Continued)

TSC traffic in the TSC dedicated transmission period, the TSC traffic of the target network device can be protected and the latency requirements can be satisfied.

16 Claims, 7 Drawing Sheets

(51) Int. Cl.
*H04B 17/345* (2015.01)
*H04W 74/08* (2009.01)

(56) References Cited

U.S. PATENT DOCUMENTS

| | | | | |
|---|---|---|---|---|
| 2017/0111922 | A1* | 4/2017 | Uchino | H04W 72/1263 |
| 2017/0290048 | A1* | 10/2017 | Amuru | H04W 72/0446 |
| 2018/0184438 | A1 | 6/2018 | Cavalcanti et al. | |
| 2019/0349979 | A1* | 11/2019 | Park | H04W 24/10 |
| 2019/0363843 | A1* | 11/2019 | Gordaychik | H04L 1/08 |
| 2020/0229055 | A1* | 7/2020 | Chien | H04W 36/0072 |
| 2020/0305199 | A1* | 9/2020 | Harada | H04W 74/0875 |
| 2020/0322869 | A1* | 10/2020 | Huang-Fu | H04W 76/22 |
| 2020/0359411 | A1* | 11/2020 | Li | H04W 16/14 |
| 2022/0210823 | A1* | 6/2022 | Alfarhan | H04L 1/1887 |

OTHER PUBLICATIONS

ZTE, "Discussion on grant-free transmission for URLLC," R1-1611296, 3GPP TSG RAN WG1 Meeting #87, Reno, USA, Nov. 14-18, 2016, Nov. 18, 2016.

\* cited by examiner

TIME SENSITIVE COMMUNICATION

FIELD

Embodiments of the present disclosure generally relate to the field of telecommunication and in particular, to devices, methods, apparatus and computer readable storage media of time sensitive communication.

BACKGROUND

Time sensitive communications (TSC) have widely existed in many modern cyber-physical systems, such as automobiles, airplanes, or industrial automation systems, are distributed computer systems. Time sensitive networking (TSN) may achieve real-time deterministic communications over Ethernet infrastructure. A typical use case of a TSC network is the closed-loop control system in which a physical entity and/or its environment is measured by a set of sensors, and the set of sensors communicate their sensor readings to one or more processors of the closed-loop control system. In the TSC network, latency of time-critical communications is guaranteed, and the cost of network functions is reduced.

In order to extend 3GPP technologies from THE wireless cellular network to the industrial automation, the 5th generation New Radio (NR) system has been integrated to the TSN as one of Ethernet bridges for TSC. Stand-alone unlicensed spectrum is supposed to be one of the key scenarios supported in NR. In addition, factories would be interested in deploying the TSC network by using the unlicensed spectrum, since the unlicensed spectrum is free. Based on the above considerations, it is necessary to support the TSC in the 5G unlicensed spectrum.

SUMMARY

In general, example embodiments of the present disclosure provide a solution of time sensitive communication.

In a first aspect, there is provided a first device. The first device comprises at least one processor; and at least one memory including computer program codes; the at least one memory and the computer program codes are configured to, with the at least one processor, cause the first device to: receive, from a plurality of second devices, information about carrier sensing to be performed by the plurality of the second devices; determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmit a first message indicative of the transmission pattern to the target second device.

In a second aspect, there is provided a second device. The second device comprises at least one processor; and at least one memory including computer program codes; the at least one memory and the computer program codes are configured to, with the at least one processor, cause the second device at least to receive, from a first device, a first message comprising a transmission pattern, the transmission pattern being determined by the first device based on information about the carrier sensing and information about time sensitive traffic of the second device, and including at least a sensing period for transmission of time sensitive traffic of the second device and a muting period of the second device; and transmit a traffic on an unlicensed band based on the transmission pattern.

In a third aspect, there is provided a method. The method comprises receiving, at a first device and from a plurality of second devices, including information about carrier sensing to be performed by the plurality of the second devices; determining a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmitting a first message indicative of the transmission pattern to the target second device.

In a fourth aspect, there is provided a method. The method comprises receiving, at a second device and from a first device, a first message comprising a transmission pattern, the transmission pattern being determined by the first device based on information about the carrier sensing and information about time sensitive traffic of the second device, and including at least a sensing period for transmission of time sensitive traffic of the second device and a muting period of the second device; and transmitting a traffic on an unlicensed band based on the transmission pattern.

In a fifth aspect, there is provided an apparatus comprising means for receiving, from a plurality of second devices, information about carrier sensing to be performed by the plurality of the second devices; means for determining a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and means for transmitting a first message indicative of the transmission pattern to the target second device.

In a sixth aspect, there is provided an apparatus comprising means for receiving, from a first device, a first message comprising transmission pattern, the transmission pattern being determined by the first device based on information about the carrier sensing and information about time sensitive traffic of the second device, and including at least a sensing period for transmission of time sensitive traffic of the second device and a muting period of the second device; and means for transmitting a traffic on an unlicensed band based on the transmission pattern.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
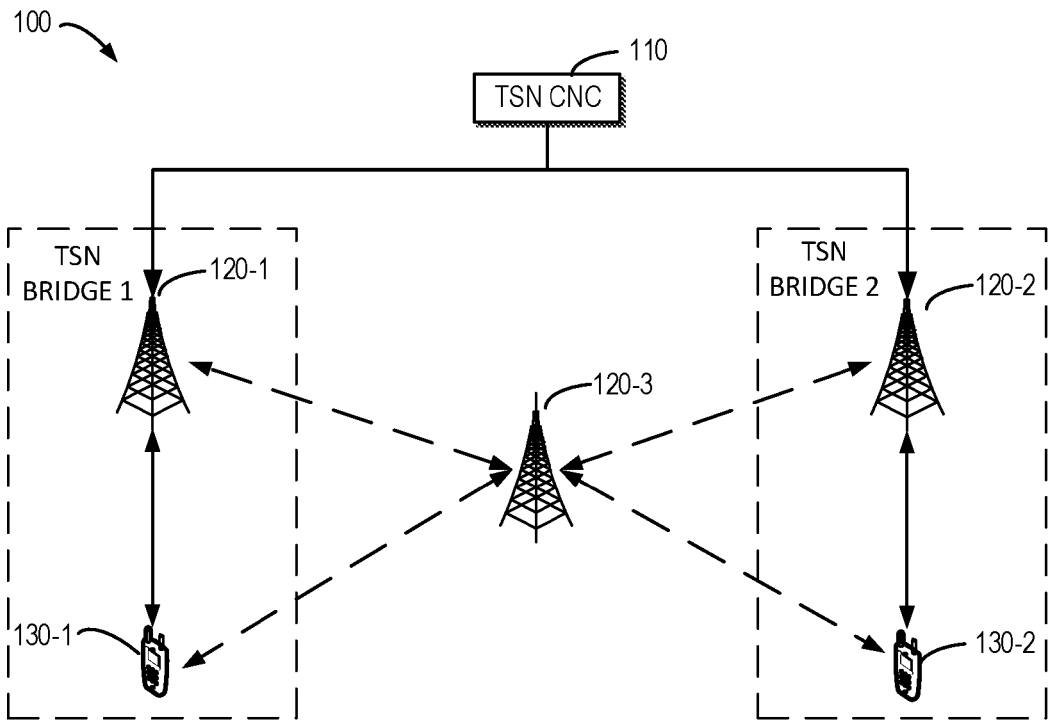
FIG. 1 shows a schematic diagram of a communication system with the wireless communication network integrated to the TSN network.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR)

communication protocols, and/or any other protocols either currently known or to be developed in the future.

Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" and "second device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

In Rel-16, the 5G NR system may serve as one of TSN bridges and has been integrated to the IEEE TSN networks for performing TSC. The TSC Assistance Information (TSCAI) as shown in table 1 below describes TSC traffic characteristics for using in the 5G system, which is provided from a session management function of the core network to the 5G Access Network (5G-AN), e.g. upon the establishment of the QoS flow. The TSCAI parameters are set according to corresponding parameters obtained from the application function (AF) of the TSN network.

TABLE 1

| TSC Assistance Information | |
|---|---|
| Assistance Information | Description |
| Flow Direction | The direction of the TSC flow (uplink or downlink). |
| Periodicity | It refers to the time period between starts of two bursts. |
| Burst Arrival time | The arrival time of the data burst at either the ingress of the RAN (downlink flow direction) or egress interface of the UE (uplink flow direction). |

FIG. 1 shows a schematic diagram of a communication system 100 with the wireless communication network integrated to the TSN network. In this scenario, the wireless communication network, such as the 5G system, is integrated to the TSN network as the TSN bridges. As shown in FIG. 1, the communication system 100 includes a TSN centralized network configuration (CNC) 110, the network device 120 and the terminal device 130. The TSN bridge 1 includes the network device 120-1 and the terminal device 130-1, and the TSN bridge 2 includes the network device 120-2 and the terminal device 130-2. Each of the TSN bridges are configured by the TSN CNC 110 to periodically open and close a gate following a specific pattern in the time domain, and thus avoiding collisions between TSC traffics generated by the different active TSN bridges. The TSN CNC 110 handles only the TSC traffics and is unaware of the normal traffic. The network devices 120-1 and 120-2 are, for example, the TSC gNBs which are able to provide both the TSC traffics and non-TSC traffics (e.g., eMBB services). The network device 120-3 is, for example, a normal gNB, which handles only normal services and is not under control of the TSN CNC 110. Therefore, the normal services deployed in the same coverage area may interfere with the TSC traffic. As shown in FIG. 1, the network device 120-3 may potentially interfere with the network devices 120-1 and 120-2. The interference to the TSC traffics may be also caused by the normal traffics of the network devices 120-1 and 120-2 per se.

Most of the applications discussed in 3GPP requiring TSC, such as, process automation, mobile robots, and Motion Control, etc., are periodic and deterministic communications, which have a pre-set sending time and with stringent requirements on timeliness and availability of the communication service. Table 2 shows use cases and requirements considered for TSN performance evaluation. However, for unlicensed spectrum access in most of regions, the transmitter needs to perform Listen-Before-Talk (LBT) for medium access to guarantee fairness and coexistence with other devices operating in the same area. In practice, before the data transmission, the gNB needs to check if the channel is busy or not by LBT. If the LBT is failed, the gNB has to back-off and would have no opportunity to transmit, which may lead to a large delay. More specifically, the LBT procedure performed before the TSC transmission may be blocked by on-going transmissions in neighbor cells. Currently, the TSN scheduler does not consider LBT impact in unlicensed spectrum.

TABLE 2

Use cases and requirements considered for TSN performance evaluation

| Case | UE | Communication service availability | Transmit period | Allowed E2E latency | Survival time | Packet size | Service area | Traffic periodicity | Use case |
|------|----|------------------------------------|-----------------|---------------------|---------------|-------------|--------------|---------------------|----------|
| I    | 20 | 99.9999% to 99.999999% | 0.5 ms | ≤Transmit period | Transmit period | 50 bytes | 15 m × 15 m × 3 m | periodic | Motion control and control-to-control |
| II   | 50 | 99.9999% to 99.999999% | 1 ms   | ≤Transmit period | Transmit period | 40 bytes | 10 m × 5 m × 3 m  | periodic | Motion control and control-to-control |
| III  | 100| 99.9999% to 99.999999% | 2 ms   | ≤Transmit period | Transmit period | 20 bytes | 100 m × 100 m × 30 m | periodic | Motion control and control-to-control |

Figure 2:
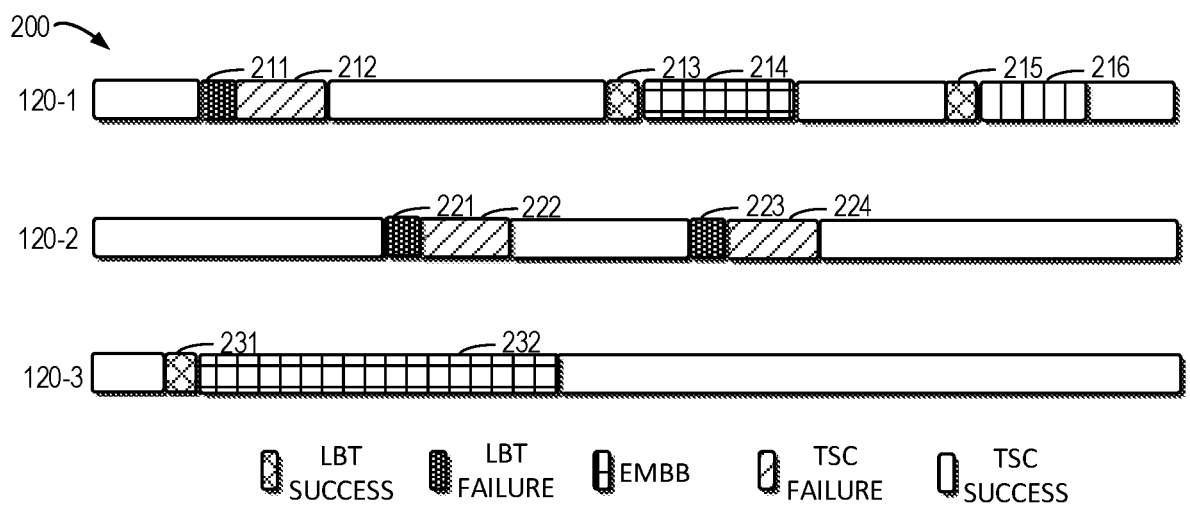
FIG. 2 shows a schematic diagram of transmissions of the network devices performed on the channel in the unlicensed spectrum.

FIG. 2 shows a schematic diagram of transmissions of the network devices performed on the channel in the unlicensed spectrum. The example shown in FIG. 2 will be explained in connection with the communication system 100 as shown in FIG. 1. As described above, each of the network devices 120-1 to 120-3 may perform the carrier sensing procedure (e.g., the LBT procedure) before transmitting on the channel. As shown in FIG. 2, since the network device 120-3 performs the LBT procedure 231 and then transmits the eMBB transmission 232 on the channel, the LBT procedures 211 and 221 performed by the network devices 120-1 and 120-2 are failed. In this case, the TSC traffic 212 and 222 of the network devices 220-1 and 120-2 are not allowed to be transmitted on the channel. After the eMBB transmission 232 is completed, the network device 120-1 performs the LBT procedure 213 successfully. The eMBB transmission 214 is then transmitted by the network device 120-1, which in turn causes the failure of the LBT procedure 223 and the TSC traffic 224 of the network device 120-2 is blocked again. Then, the LBT procedure 215 of the network device 120-1 is successful and the TSC traffic 216 of the network device 120-1 is transmitted on the channel. As such, the TSC transmissions on the channel in the unlicensed spectrum may be blocked due to interference from neighbor cells. Thus, it is difficult to satisfy the latency requirement for TSC communication due to the carrier sensing procedure.

The existing TSN has a powerful scheduler to avoid any collision in wired Ethernet links. The gate of a TSN bridge will open/close sequentially. TSN CNC can guarantee no collisions for TSC traffic, but collisions may come from other normal services of the TSC gNBs and normal gNBs. In addition, the TSC scheduler is not designed to operate in the wireless domain, thus LBT impacts over the channel access in unlicensed spectrum are not considered. In NR-U TDD system, there were some mechanisms for the DL/UL slot coordination among eNB/gNBs, taking the cross-link (DL-to-UL or UL-to-DL) interference mitigation into consideration. However, even though the whole network can have the same frame structure, the LBT blocking issue is still existed due to the DL-to-DL block or the UL-to-UL block.

Therefore, the embodiments of the present disclosure propose a coordination method for ensuring deterministic time sensitive traffic (e.g., TSN) QoS in unlicensed spectrum. In addition, a coordination controller is introduced as a coordination function to enable the creation of transmission patterns for each network device (e.g., eNB or gNB) and protect LBT regions for time sensitive traffic (e.g., URLLC traffic) in the whole network. Based on the determined transmission pattern, each network device can access the channel for performing the time sensitive transmission (e.g., for TSC traffic) within a dedicated contention-free region, where no any transmission from other interfering network device would be allowed. Such a mechanism can improve the successful access rate when the base station performs LBT for TSC transmission, and thus satisfying the latency requirement of TSC traffic in unlicensed spectrum. By creating a contention-free region for TSC traffic to access the channel, the transmission block due to LBT failure can be avoided and the delay requirement of the TSC communication can be guaranteed.

Figure 3:
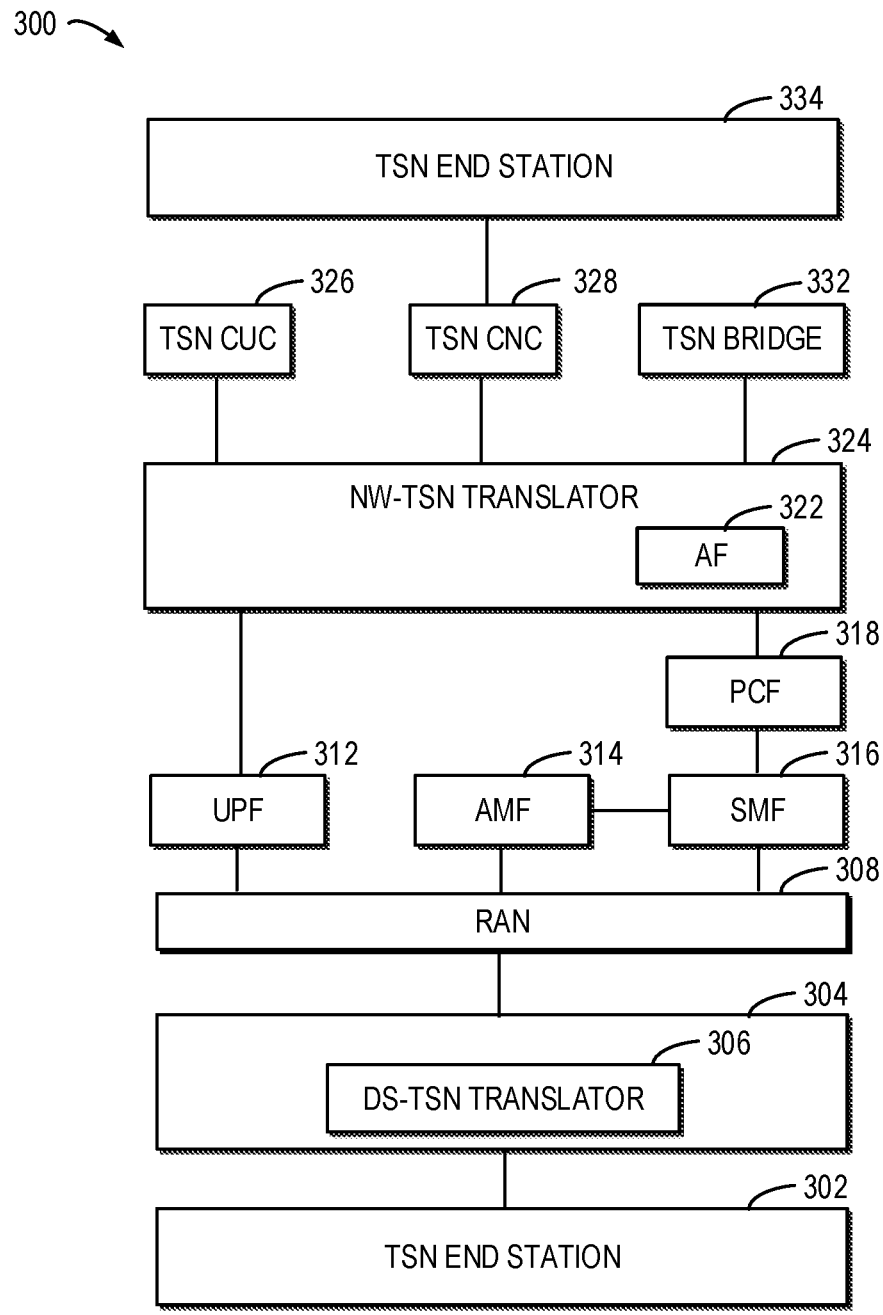
FIG. 3 shows a schematic diagram of a basic bridge model for integrating the wireless communication system with the TSN in which embodiments of the present disclosure can be implemented.

FIG. 3 shows a schematic diagram of a basic bridge model for integrating the wireless communication system with the TSN in which embodiments of the present disclosure can be implemented. The communication system 300 includes TSN end stations 302 and 334, the terminal device 304 including device-side TSN translator 306, RAN 308, a user plane function (UPF) 312, an access and mobility management function (AMF) 314, a session management function (SMF) 316, policy control function (PCF) 318, network side TSN translator 324 including an application function (AF) 322, TSN centralized user configuration (TSN CUC) 326, TSN centralized network configuration (TSN CNC) 328, and TSN bridge 332. Some enhancements and enables (e.g. the TSC assistance information (TSCAI)) have been studied on the application layer protocol to support certain functionalities (e.g. appropriate routing and delivery of packets, synchronization) in the wireless communication system (e.g., the 5G NR system). The knowledge of TSN traffic pattern is useful for the network device, such as the gNB (not shown) of RAN 308 to more efficiently schedule periodic, deterministic traffic flows either via configured grants, semi-persistent scheduling or with dynamic grants.

Figure 4:
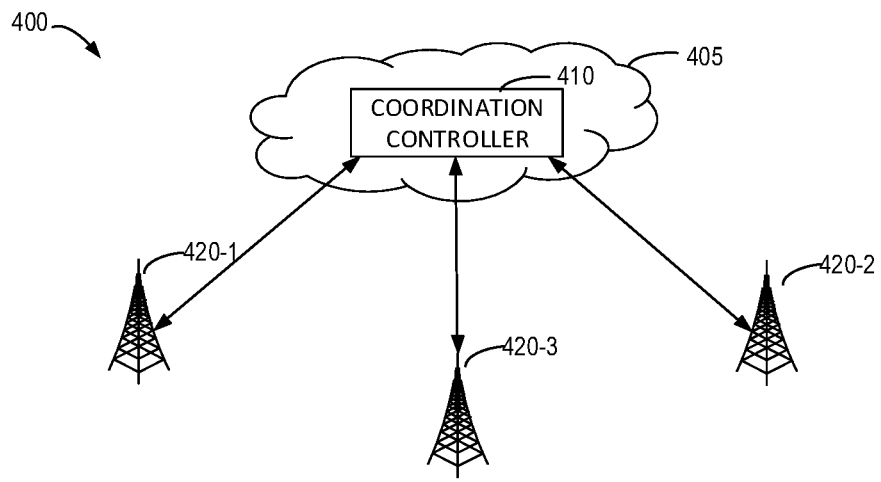
FIG. 4 shows an example environment in which embodiments of the present disclosure can be implemented according to some example embodiments of the present disclosure.

FIG. 4 shows an example environment 400 in which embodiments of the present disclosure can be implemented. As shown in FIG. 4, the communication environment 400 includes the first device 410 that is deployed in the core network 405 and the second devices 420-1 to 420-3 (collectively referred as second device 420, or also referred to as the TSC network devices 420-1 and 420-2, as well as the normal network device 420-3).

The first device 410 may be a coordination controller deployed at the session management function (SMF) of the core network 405. The coordination controller 410 is configured to coordinate the channel resources for performing the clear channel assessment (CCA) procedures among RANs including the second device 420. The SMF may control all of the second devices 420 in the communication environment 400, and maintain information about the time sensitive traffic of the second device 420. In some embodiments, the coordination controller 410 may communicate with the second device 420 via the AMF by using a F1 interface, such as N2, N11 and so on.

By way of example, the second devices 420-1 and 420-2 may handle both the TSC traffic and the normal traffic, while the second device 420-3 may handle only the normal traffic. As discussed above, interferences to the TSC traffics of the second devices 420-1 and 420-2 may come from the neighbor cell managed by the second device 420-3. Additionally, or alternatively, interferences to the TSC traffic of each of the second devices 420-1 and 420-2 may also come from the normal traffic of their own. The second device 420 may learn its own TSC traffic information from the first device 410. The second device 420 may serve one or more terminal devices (not shown).

It is also to be understood that the number of network devices, terminal devices and serving cells shown in FIG. 4 is given for the purpose of illustration without suggesting any limitations.

Depending on the communication technologies, the network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Tenn Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation of communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for LTE, and LTE terminology is used in much of the description below.

Figure 5:
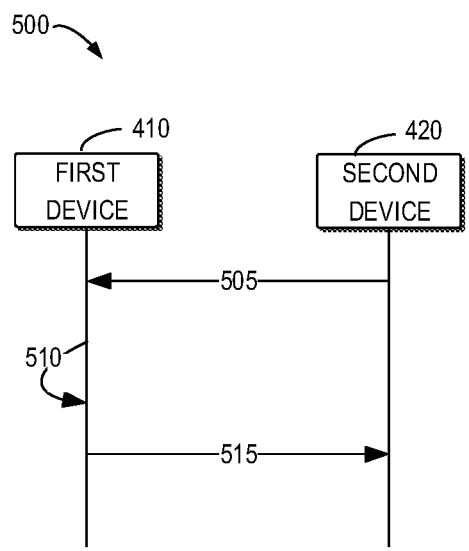
FIG. 5 shows a signaling chart illustrating a channel coordination process according to some example embodiments of the present disclosure.

Principle and implementations of the present disclosure will be described in detail below with reference to FIGS. 5 and 6. FIG. 5 shows a signaling chart illustrating a process of channel coordination according to some example embodiments of the present disclosure. For the purpose of discussion, the process 500 will be described with reference to FIG. 4. The process 500 may involve the first device 410 and the second device 420.

As described above with connection with FIG. 4, in the communication environment 400 where the wireless communication system (e.g., the 5G NR system) is integrated with the TSN network, the first device 410 may be the coordination controller deployed at the SMF of the core network 405, and configured to coordinate the channel resources for performing transmission on the channel in the unlicensed spectrum. The first device 410 may collect information for assisting the channel coordination from the second device 420 and/or the SMF. The second devices 420-1 to 420-3 may respectively operate in different RANs, for example, RAN 1, RAN 2, and RAN 3 (not shown), with each of the second devices 420-1 and 420-2 handling both the TSC traffic and the normal traffic, and the second device 420-3 handling only normal traffic.

The first device receives 505 from a plurality of second devices 420-1 to 420-3 information about carrier sensing to be performed by a corresponding second device 420. The information about the carrier sensing may include TSC access information that indicates a type and duration of the carrier sensing to be performed by the second device 420 on the unlicensed band.

The first device 410 may obtain time sensitive traffic characteristic information that is preconfigured at the SMF, and including but not limited to, for example, an arrival time, a packet delay budget, and a traffic priority of the time sensitive traffic from each of the second device 420. The first device 410 determines 510 a transmission pattern for one of the second devices 420-1 to 420-3 based on the information about the carrier sensing and preconfigured information about time sensitive traffic of the plurality of the second devices 420. The transmission pattern may include at least a sensing period for transmission of time sensitive traffic and a muting period of the corresponding second device 420. The transmission pattern may be designed for each of the second devices 420, which will be described below in details.

The first device 410 may further obtain network discovery information from all of the network devices in the communication environment 400. The network discovery information may be reported as a list of interfering cell IDs and corresponding interference levels. The network discovery information may be used for determining the plurality of second devices 420 to which the transmission pattern is to be determined, which will be described below in details. After the transmission pattern is determined, the first device 410 transmits 515 a first message indicative of the transmission pattern to each of the second device 420.

Figure 6:
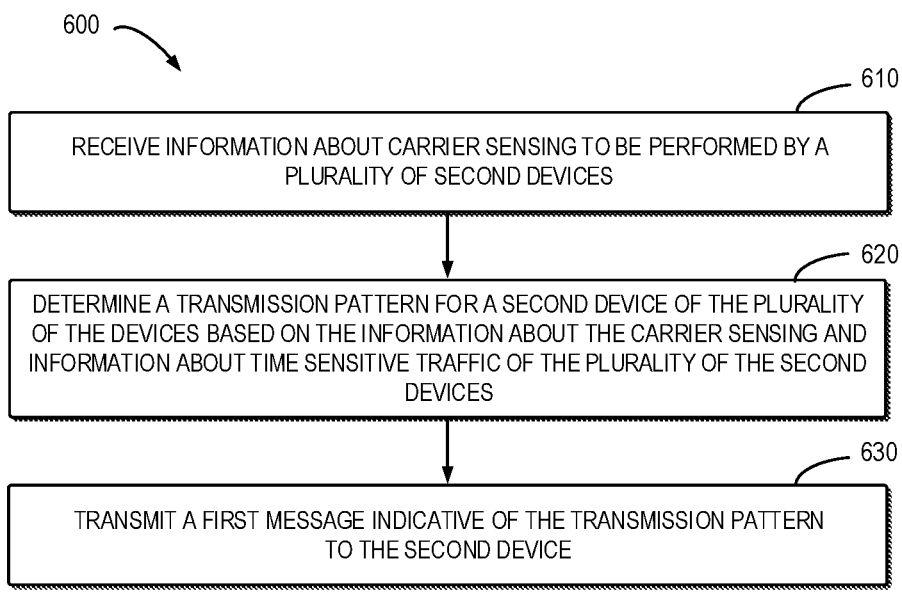
FIG. 6 shows a flowchart of an example method of channel coordination according to some example embodiments of the present disclosure.

FIG. 6 shows a flowchart of an example method of channel coordination according to some example embodiments of the present disclosure. The method 600 can be implemented at a network device in the core network, e.g., the first device 410 described with reference to FIG. 4. The method 600 can be also implemented at a central network device, for example, the CU in the RAN, e.g., the first device 710 described with reference to FIG. 7, which will be discussed in details below.

At 610, the first device 410 receives, from a plurality of second devices 420-1 to 420-3, information about carrier sensing to be performed by the plurality of second devices 420-1 to 420-3. In some embodiments, the information about carrier sensing may indicate the type and duration of the carrier sensing to be performed by each of the second device 420-1 to 420-3 on the unlicensed band. By way of example, the duration of the carrier sensing may include an expected LBT duration of the second device 420 that handle the TSC traffic. The LBT duration is estimated by the second device 420 and may depend on the channel interference condition (such as, the Wi-Fi interference) and the LBT type. The type of the carrier sensing may include the LBT type of the second device 420, including but not limited to the Cat 4 LBE (UE category 4 load-based equipment), Cat 2 LBE, FBE (frame-based equipment) and so on. In some embodiments, the information about carrier sensing may be provided by the second device 420 via the F1 interface.

As discussed earlier, not all other network devices in the communication system may interfere with the time sensitive traffic from one network device, and the interference levels to the time sensitive traffic vary from one network device to another. In other words, the plurality of second device 420 may be a portion of the network devices in the communication system. In order to determine which network devices may interfere with each other and need to be coordinated as the plurality of second devices 420, the first device 410 may obtain the network discovery information from all the network devices controlled by it. In some embodiments, the first device 410 may obtain a second message from each of candidate devices (not shown) controlled by the first device 410, for example, a plurality of network devices controlled by first device 410. The second message may include information about at least one neighbor cell of a corresponding candidate device that interferes with the carrier sensing performed by the candidate device. For example, such information may be the network discovery information and indicate an identity and an interference level of at least one neighboring candidate device of the candidate device that manages the at least one neighbor cell.

In the above embodiment, the network discovery information may be obtained from the candidate device by measuring reference signals (e.g., SSB, CRI-RS) of its neighbour cells managed by at least one neighbouring candidate device. For example, for a candidate device, if the measured RSRP of its neighbour cell is above a predetermined threshold value, the neighbouring candidate device managing the neighbour cell may be considered as the second device 420 that interfere with the candidate device. Any other methods for measuring the interference level of the neighbour cells can be used, and the present disclosure is not limited to this aspect.

In some other embodiments, the network discovery information may be obtained from the terminal device (not shown) served by the candidate device. The terminal device may measure the reference signal (e.g., SSB, CRI-RS) of its neighbour cell. For example, if the measured RSRP of its neighbour cell is above a predetermined threshold value, the terminal device may report the measurement result to its serving network device, i.e., the candidate device. The candidate device may then determine whether the neighbour candidate device managing the neighbour cell interferes with the candidate device based on the measurement result.

Figure 7:
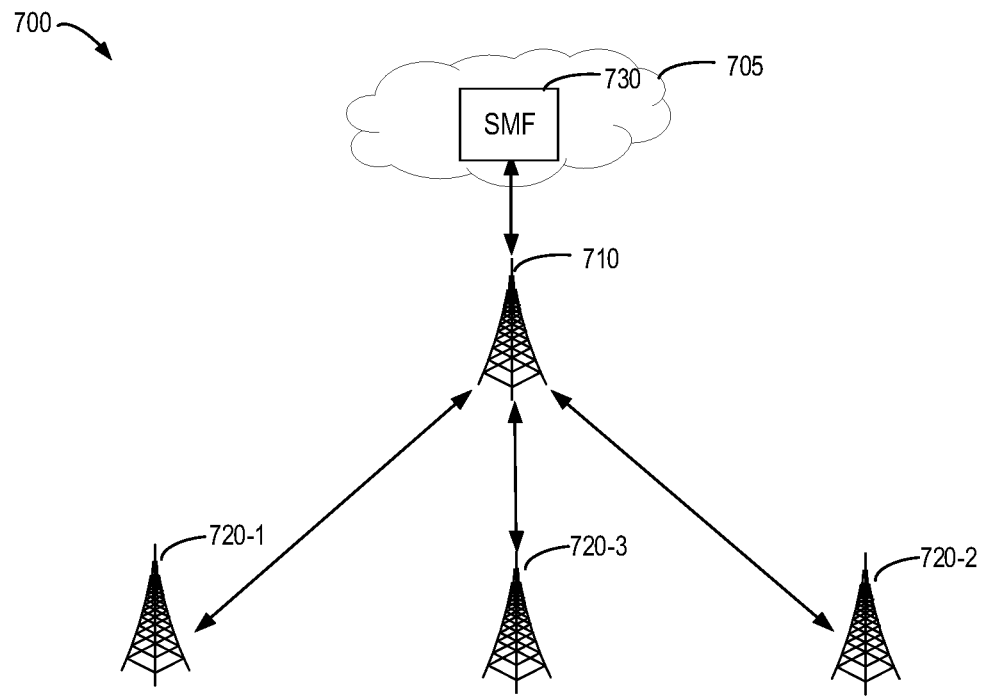
FIG. 7 shows another example environment in which embodiments of the present disclosure can be implemented.

In some embodiments, the first device 410 may obtain time sensitive traffic characteristic information that is preconfigured at the SMF, including but not limited to, for example, an arrival time, a packet delay budget, and a traffic priority of the time sensitive traffic of the second devices 420, for example, the second device 420-1 and 420-2. For example, such preconfigured information may be provided from the core network 405 when each of the QoS flows has been established by the SMF. In a case where the first device is the CU of the RAN, for example, the first device 710 as shown in FIG. 7, the time sensitive traffic characteristic information may also be obtained from the SMF of the core network, which will be described with reference to FIGS. 7-9 below in details.

At 620, the first device 410 determines the transmission pattern for a second device of the plurality of second devices 420-1 to 420-3 based on the information about the carrier sensing and information about time sensitive traffic of the plurality of the second devices 420. The transmission pattern includes at least a sensing period for transmission of time sensitive traffic and a muting period of the second device 420.

In some embodiments, the sensing period may be specific to a target second device 420 of the plurality of the second device 420. The target second device 420 may handle the time sensitive traffic. During this period, the target second device 420 has the highest priority, among the plurality of the second devices 420, for transmitting the time sensitive traffic on the channel. In other words, the sensing period is dedicated to the target second device, and the rest of the plurality of the second devices 420 are not allowed to transmit any traffic during this period. The sensing period may cover at least the duration of the carrier sensing procedure, for example, the LBT duration of the target second device 420. The location of the sensing period may be determined based on the burst arrive time of the time sensitive traffic of the target second device 420.

Additionally, or alternatively, the sensing period may extend to include the transmission duration of the time sensitive traffic of the target second device 420, based on the interference levels of the rest of the plurality of the second devices 420 to the target second device 420. As such, the transmission performance of the target second device 420 is further protected. The maximum duration of the sensing period may be determined based on the packet delay budget of the second device 420, since the time sensitive traffic has to be transmitted within the allowed latency.

In some embodiments, the first device 410 may determine the sensing period for the target second device 420 based on the information about the carrier sensing and the information about the time sensitive traffic. By way of example, the first device 410 may calculate the sensing period for the target second device 420 based on the burst arrive time, the packet delay budget, the traffic priority, the expected LBT duration, the LBT type, and selectively interference level and etc. For example, for the Cat.2 LBE or FBE, the LBT duration is deterministic (e.g., 9 us, 25 us, 34 us, etc.). For the Cat.4 LBE, the LBT duration may be uncertain. In this case, the duration of the sensing period may include the expected LBT duration, and may be further extended when the time sensitive traffic can't be transmitted due to the LBT failure. The first device 410 may determine the sensing period for each of the plurality of second devices 420.

In some embodiments, the first device 410 may determine at least one sensing period of the rest of the plurality of second devices 420 to be the muting period of the target second device 420. During the muting period, the target second device 420 is not allowed to transmit any traffic. The muting period may at least cover the durations in which the rest of the plurality of second devices 420 perform their carrier sensing procedures. Additionally, or alternatively, the muting period may extend to include transmission durations of the rest of the plurality of the second devices 420 to further protect the transmission performance of the second device 420, which may depend on the interference level of the target second device 420 to the rest of the plurality of the second devices 420.

In some embodiments, the muting period of the target second device 420 may be determined based on the information about time sensitive traffic of the rest of the plurality of the second devices 420. In some other embodiments, the muting period may be determined based on the interference level of the target device 420 to the rest of the plurality of the second devices 420. In some embodiments, the maximum duration of the sensing period may be determined based on the packet delay budget of the target second device 420, since the time sensitive traffic of the target device 420 has to be transmitted within the allowed latency.

In some embodiments, the transmission pattern may include a shared period. The first device 410 may determine transmission occasions outside the sensing periods and the muting periods to be the shared period. During the shared period, the plurality of the second devices 420 may transmit their non-time sensitive traffic on the channel in a contention-based manner.

At 630, the first device 410 transmits a first message indicative of the transmission pattern to the second device 420. The first message may include information at least indicating start times and durations of the at least sensing period and the muting period of the second device 420. In some embodiments, the first device 410 may distribute the determined transmission pattern (e.g., per gNB) to all the second devices 420 in the network via AMF by using the N2 interface.

According to the embodiments of the present disclosure, with the transmission pattern, no conflict will occur between the interfering network devices in accessing the channel in the unlicensed band. Therefore, the resource utilization in the unlicensed band can be improved and the requirements on TSN can be satisfied.

According to the example embodiments of the present disclosure, the coordination controller may be deployed within the RAN of the communication system. In this case, the architecture of RANs may be the centralized unit-distributed unit (CU-DU) structure. FIG. 7 shows another example environment 700 in which embodiments of the present disclosure can be implemented. As shown in FIG. 7, the communication environment 700 includes the first device 710 that is the coordination controller deployed on the CU and the second devices 720-1 to 720-3 (collectively referred as second device 720, or also referred to as the TSC network devices 720-1 and 720-2, as well as the normal network device 720-3). The second device 720 may act as the DUs.

The first device 710 may be the coordination controller deployed at a network device acting as the CU, and communicate with the second device 720 via the F1 interface. The coordination controller 710 is configured to coordinate, based on the transmission pattern, the channel resources for performing the clear channel assessment (CCA) procedures among RANs including the second device 720. In some embodiments, the first device 710 may obtain the information about time sensitive traffic of the second device 720 from the third device 730 that may be a management device 730 of the core network 705 and configured with a session management function.

In some embodiments, the first device 710 determines the transmission pattern for a target second device of the plurality of the devices based on the information about the carrier sensing and information about time sensitive traffic of the plurality of the second devices. In the context of the present disclosure, the transmission pattern may include at least a sensing period for transmission of time sensitive traffic of the target second device and a muting period of the target second device. In some other embodiments, the transmission pattern determined by the first device 710 may further include a shared period.

In some embodiments, the first device 710 may determine the sensing period based on the information about the carrier sensing and the information about the time sensitive traffic. During the sensing period, the second device 720 has the highest priority among the plurality of the target second devices 720 for transmitting the time sensitive traffic.

In some embodiments, the first device 720 may determine at least one sensing period of the rest of the plurality of second devices 720 to be the muting period of the target second device 720. In some other embodiments, the first device 710 may determine the muting period of the target second device 720 based on the interference level of the target second device 720 caused to the rest of the plurality of the second devices 720. During the muting period, the target second device 720 is not allowed to transmit any traffic.

In order to minimize a waste of the channel resources, instead of all of the network devices in the whole communication system, only a portion of the network devices are to be muted when the time sensitive traffic is transmitted. In this case, the first device 710 may determine which network devices can be considered as the plurality of second devices 720. In some embodiments, the first device 710 may receive a second message one of candidate devices controlled by the first device 710. In this case, the candidate devices may be the network devices. The second message may include information about at least one neighbor cell of the candidate device that interferes with the carrier sensing performed by the candidate device. The first device 710 may determine, from the plurality of the candidate devices, the plurality of the second devices 720 to be coordinated with the transmission pattern based on the information about the at least one neighbor cell. The information may indicate, for example, an identity and an interference level of at least one neighboring candidate device of the candidate device that manages the at least one neighbor cell.

In some embodiments, the first device 710 may determine the transmission pattern to be including the at least one sensing period, the muting period and the shared period. The first device 710 may determine transmission occasions outside the sensing periods and the muting periods to be a shared period. During the shared period, the plurality of the second devices 720 may transmit the non-time sensitive traffic or the normal traffic in a contention-based manner.

In some embodiments, the first device 710 may transmit a indicative of the transmission pattern to the target second device 720. In some embodiments, the first message may include information at least indicating start times and durations of the at least sensing period and the muting period of the target second device 720. The sensing period of the target second device 720 at least includes a duration of carrier sensing procedure of the target second device 720, for example, the LBT duration of the target second device 720. In some embodiments, the sensing period of the target second device 720 further includes a transmission duration of the time sensitive traffic of the target second device 720. In some embodiments, the muting period of the target second device 720 includes the sensing periods and the transmission durations of the rest of the plurality of the second devices 720.

The second device 720 may be the network devices acting as the DUs within different RANs. Similar with the second device 420 shown in FIG. 4, the second devices 720-1 and 720-2 may handle both the time sensitive traffic and the normal traffic, while the second device 720-3 may handle only the normal traffic. As discussed above, interferences to the time sensitive traffics of the second devices 720-1 and 720-2 may come from the neighbor cell managed by the second device 720-3. Additionally, or alternatively, interferences to the time sensitive traffic of each of the second devices 720-1 and 720-2 may also come from the normal traffic of their own. The second device 720 may learn its own time sensitive traffic information from the third device 730. In some embodiments, the second device may transmit the traffic on the unlicensed band based on the transmission pattern received from the first device 710.

The third device 730 may be the management device (e.g., SMF) of the core network 705 and communicate with the first device 710 and the second device 720 within different RANs. The third device 730 may be configured to maintain the information about time sensitive traffic of the second device 720.

It is also to be understood that the number of network devices, terminal devices and serving cells shown in FIG. 7 is given for the purpose of illustration without suggesting any limitations.

Figure 8:
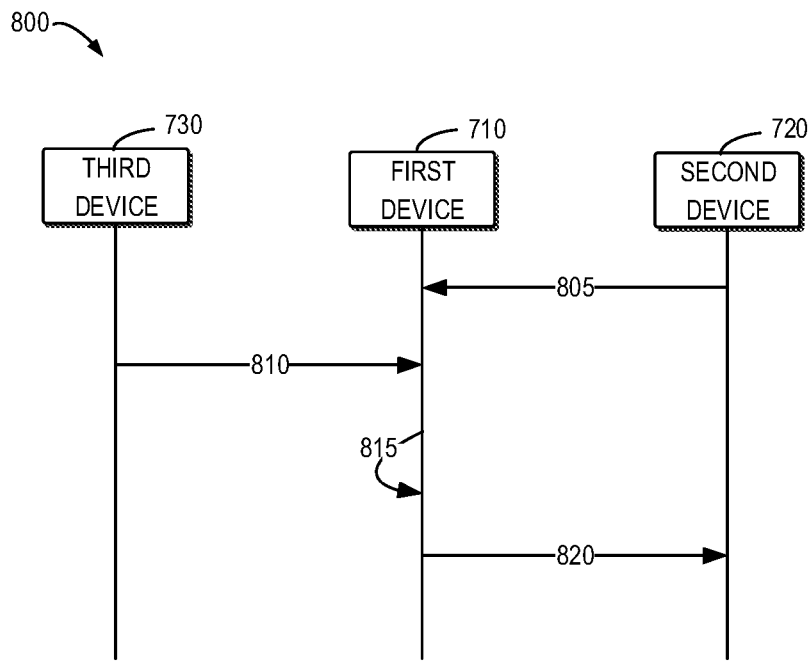
FIG. 8 shows a signaling chart illustrating a channel coordination process according to some example embodiments of the present disclosure.

Principle and implementations of the present disclosure will be described in detail below with reference to FIGS. 6 and 8. FIG. 8 shows a signaling chart illustrating a process of channel coordination according to some example embodiments of the present disclosure. For the purpose of discussion, the process 800 will be described with reference to FIG. 7. The process 800 may involve the first device 710, the second device 720 and the third device 730.

As described above with connection with FIG. 7, in the communication environment 700 where the wireless communication system (e.g., the 5G NR system) is integrated with the TSN network, the first device 710 may be the coordination controller deployed at the CU, and configured to coordinate the channel resources for performing transmission on the channel in the unlicensed spectrum. The first device 710 may collect information for assisting the channel coordination from the third device 730 and the second device 720. Similar with the second devices 420-1 to 420-3 shown in FIG. 4, the second devices 720-1 to 720-3 may respectively operate in different RANs, for example, RAN 1, RAN 2, and RAN 3 (not shown), with each of the second devices 720-1 and 720-2 handling both the time sensitive traffic and the normal traffic, and the second device 720-3 handling only the non-time sensitive traffic.

The first device 710 obtains 805 information about time sensitive traffic of a plurality of second devices 720 from the third device 730. The information about the time sensitive traffic includes at least one of an arrival time, a packet delay budget, a traffic priority of the time sensitive traffic and so on. The first device 710 receives 810, from the plurality of second devices 720, information about carrier sensing to be perform by the plurality of second devices. The first device 710 determines 815 a transmission pattern for a target second device 720 of the plurality of the second devices 720 based on the information about the carrier sensing and the information about the time sensitive traffic. The transmission pattern includes at least a sensing period for transmission of time sensitive traffic and a muting period of the target second device 720. After the transmission pattern is determined, the first device 710 transmits 820 a first message indicative of the transmission pattern to the target second device 720.

Figure 9:
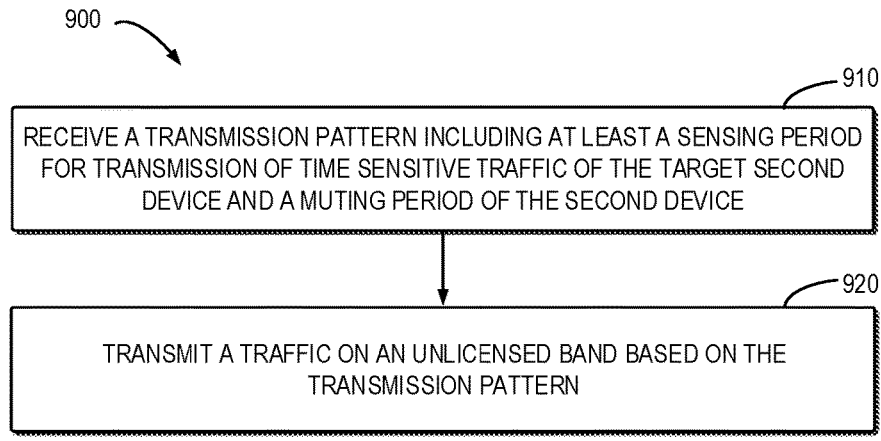
FIG. 9 shows a flowchart of an example method of channel coordination according to some example embodiments of the present disclosure.

FIG. 9 shows a flowchart of an example method of channel coordination according to some example embodiments of the present disclosure. The method 900 can be implemented at a network device in the RAN, e.g., the second devices 420 and 720 described with reference to FIGS. 4 and 7. For the purpose of discussion only, the example shown in FIG. 9 will be explained in connection with the communication system 700 as shown in FIG. 7. It should be understood that the example is for illustrative purpose only, and similar improvements and benefits can also be achieved by the communication system 400 as shown in FIG. 4.

At 910, the second device 720 receives from the first device 710 the first message including the transmission pattern. In some embodiments, the transmission pattern may include at least a sensing period for transmission of time sensitive traffic of the second device 720 and a muting period of the second device 720. In this case, the transmission pattern may be designed per second device 720.

The transmission pattern may be determined by the first device 710 based on the information about the carrier sensing and the information about time sensitive traffic of the second device. As discussed above, the information about time sensitive traffic of the second device 720 may be obtained from the third device 730, for example, the SMF of the core network 705.

At 920, the second device 720 transmit the traffic on the unlicensed band based on the transmission pattern. In the context of the present disclosure, the sensing period may refer to a duration specific to the second device 720 for sensing the channel and transmitting the time sensitive traffic. During this period, only the second device 720 is allowed to transmit the time sensitive traffic on the channel, that is, the second device 720 has the highest priority among the plurality of the second devices 720 for transmitting the time sensitive traffic. Accordingly, the second device 720 may transmit the time sensitive traffic in a contention free manner. The sensing period may at least include the listen-before-talk duration of the second device 720. As such, the second device 720 is ensured to occupy the channel successfully. In order to protect the performance of the time sensitive communication, in some other embodiments, the sensing period may be extended to cover the transmission duration of the time sensitive traffic of the second device 720.

The muting period of the second device 720 may at least include the sensing periods of other network devices that might interfere with the second device 720. Additionally, or alternatively, the muting period may be extended to cover the transmission durations of the other network devices. During the muting period, the second device 720 is not allowed to perform the carrier sensing procedure and transmit any traffic on the channel.

In some embodiments, the transmission pattern may also include a shared period, which may include the transmission occasions outside the sensing periods and the muting periods. During the shared period, all of the second devices 720 may transmit their non-time sensitive traffics in a contention-based manner.

Figure 10:
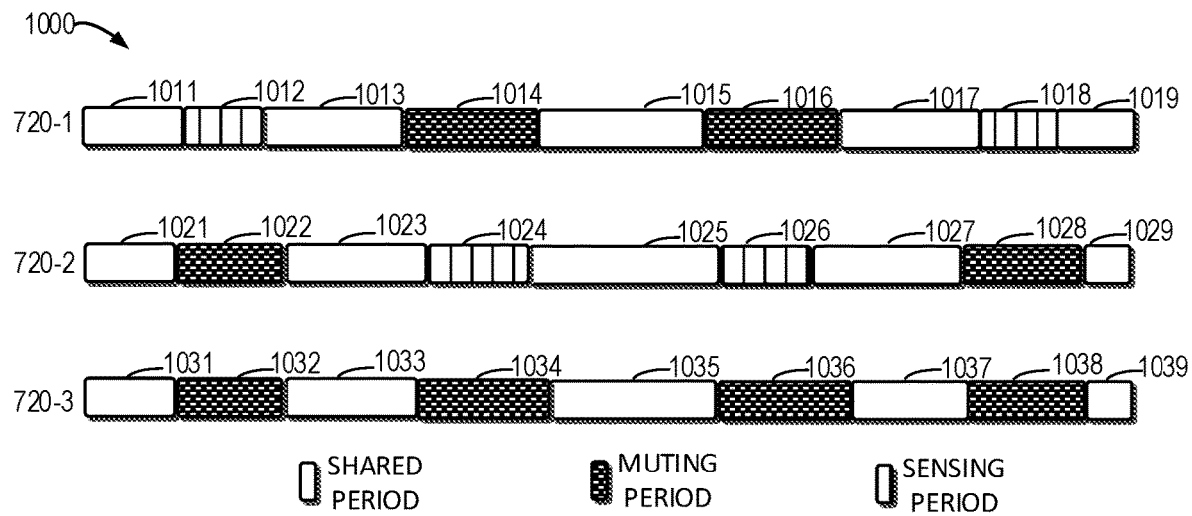
FIG. 10 shows a schematic diagram of the transmission pattern for the network devices in the unlicensed spectrum according to some example embodiments of the present disclosure.

FIG. 10 shows a schematic diagram of the transmission pattern for the network devices in the unlicensed spectrum according to some example embodiments of the present disclosure. The example shown in FIG. 10 will be explained in connection with the communication system 700 as shown in FIG. 7. It should be understood that the example is for illustrative purpose only, and similar improvements and benefits can also be achieved by the communication system 400 as shown in FIG. 4.

As shown in FIG. 10, before the second device 720 performs any sensing carrier procedure or transmission of traffics, the first device 710 determines the transmission pattern for each of the second device 720 that may interfere with each other. In the transmission pattern, the sensing periods 1012 and 1018 are specific to the second device 720-1. During these periods, other second devices such as second devices 720-2 and 720-3 are not allowed to transmit any traffic on the channel, and thus corresponding periods 1022 and 1028 as well as 1032 and 1038 are muting periods for the second devices 720-2 and 720-3, respectively. Similarly, the sensing periods 1024 and 1026 are specific to the second device 720-2, while periods 1014 and 1016 as well as 1034 and 1036 are muting periods for the second devices 720-1 and 720-3 respectively. Since the second device 720-3 is the network device handling only non-time sensitive traffics (i.e., the normal traffic), there is no need for allocating the second device 720-3 with a specific sensing period. The remaining transmission occasions may be used for shared periods. For example, during periods 1011, 1013, 1015, 1017 and 1019, the second device 720-1 may attempt to access the channel in the contention-based manner. Similarly, the periods 1021, 1023, 1025, 1027 and 1029 are muting periods for the second device 720-2, and the periods 1031, 1033, 1035, 1037 and 1039 are muting periods for the second device 720-3.

By such a channel coordination mechanism, the TSC service can be supported in the unlicensed band. For example, in application to the 5G system, any gNB including the normal gNB can access the channel for transmission of the traffic at the shared time resources if the LBT is successful, and any TSC gNB can only access the channel for transmission of the TSC traffic in its own TSC dedicated period if LBT is successful. According to the embodiments of the present disclosure, the coordination controller, serving as a network function for coordinating the transmissions of the network device can be deployed at either the RAN or the core network by using existing interfaces. Therefore, the interoperability of the TSN base station and the normal base station is effectively improved, and the latency requirements of the time sensitive traffic can be guaranteed. M moreover, the waste of the channel resources in the unlicensed band can be minimized.

In some example embodiments, an apparatus capable of performing the method 600 (for example, the first device 410 or 710) may comprise means for performing the respective steps of the method 600. The means may be implemented in any suitable form. For example, the means may be implemented in a circuitry or software module. The apparatus may be implemented as or included in one of the first device 410 and 710. In some embodiments, the means may comprise at least one processor and at least one memory including computer program code. The at least one memory and computer program code are configured to, with the at least one processor, cause performance of the apparatus.

In some example embodiments, the apparatus comprises means for receiving, from a plurality of second devices, information about carrier sensing to be performed by the plurality of the second devices; means for determining a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and means for transmitting a first message indicative of the transmission pattern to the target second device.

In some example embodiments, the information about the carrier sensing at least indicates a type and duration of the carrier sensing to be performed on an unlicensed band.

In some example embodiments, the information about the time sensitive traffic includes at least one of an arrival time, a packet delay budget, and a traffic priority of the time sensitive traffic.

In some example embodiments, the means for determining the transmission pattern comprises: means for determining, based on the information about the carrier sensing and the information about the time sensitive traffic, the sensing period, the target second device having a highest priority, among the plurality of the second devices, for transmitting the time sensitive traffic during the sensing period; and means for determining at least one sensing period of the rest of the plurality of second devices to be the muting period of the target second device, the target second device being not allowed to transmit during the muting period.

In some example embodiments, the apparatus further comprises means for receiving a second message from one of candidate devices controlled by the first device, the second message including information about at least one neighbor cell of the candidate device that interferes with the carrier sensing performed by the candidate device; and means for determining, from the plurality of the candidate devices, the plurality of the second devices to be coordinated with the transmission pattern based on the information about the at least one neighbor cell, the information indicating an identity and an interference level of at least one neighboring candidate device of the candidate device that manages the at least one neighbor cell.

In some example embodiments, the means for determining the transmission pattern comprises: means for determining, based on the information about the carrier sensing and the information about the time sensitive traffic, the sensing period, the target second device having a highest priority, among the plurality of the second devices, for transmitting the time sensitive traffic during the sensing period; and means for determining the muting period of the target second device based on the interference level of the target second device caused to the rest of the plurality of the second devices, the target second device not allowed to transmit during the muting period.

In some example embodiments, the means for determining the transmission pattern further comprises: means for determining transmission occasions outside the sensing periods and the muting periods to be a shared period, the plurality of the second devices transmitting non-time sensitive traffic in a contention-based manner during the shared period; and means for determining the transmission pattern to be including the at least one sensing period, the muting period and the shared period.

In some example embodiments, the means for transmitting the first message comprises: means for transmitting the first message including information at least indicating start times and durations of the at least sensing period and the muting period.

In some example embodiments, the sensing period of the target second device at least includes a listen-before-talk duration of the target second device.

In some example embodiments, the sensing period of the target second device further includes a transmission duration of the time sensitive traffic of the target second device.

In some example embodiments, the muting period of the target second device includes sensing periods and transmission durations of the rest of the plurality of the second devices.

In some example embodiments, the information about time sensitive traffic is preconfigured at the first device.

In some example embodiments, the first device is a management device at a core network and configured with a session management function, and the plurality of the second devices are network devices.

In some example embodiments, the apparatus further comprises means for obtaining the information about time sensitive traffic from a management device at a core network, the management device being configured with a session management function.

In some example embodiments, the first device is a central network device, and the plurality of the second devices are distributed network devices.

In some example embodiments, an apparatus capable of performing the method 900 (for example, the second devices 420 and 720) may comprise means for performing the respective steps of the method 900. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the apparatus. The apparatus may be implemented as or included in the second device 720.

In some example embodiments, the apparatus comprises means for receiving, from a first device, a first message comprising a transmission pattern, the transmission pattern being determined by the first device based on information about the carrier sensing and information about time sensitive traffic of the second device, and including at least a sensing period for transmission of time sensitive traffic of the second device and a muting period of the second device; and means for transmitting a traffic on an unlicensed band based on the transmission pattern.

In some example embodiments, the transmission pattern further comprises a shared period, and the traffic comprises at least one of the time sensitive traffic and non-time sensitive traffic, and means for transmitting the traffic based on the transmission pattern comprises at least one of: means for transmitting the time sensitive traffic during the sensing period; means for transmitting the non-time sensitive traffic during the shared period; and means for transmitting no traffic during the muting period.

In some example embodiments, the first device is a management device at a core network and configured with a session management function, and the second device is a network device.

In some example embodiments, the first device is a central network device, and the second device is a distributed network device. .

Figure 11:
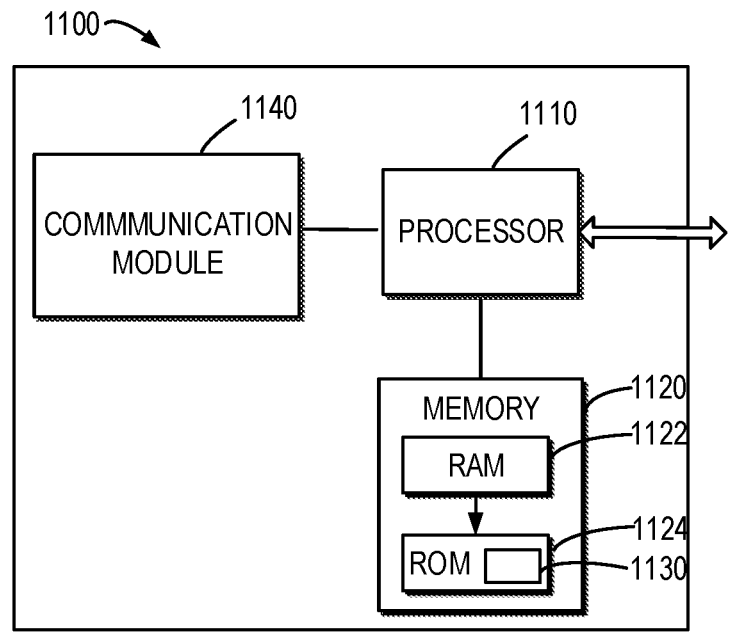
FIG. 11 shows a simplified block diagram of a device that is suitable for implementing example embodiments of the present disclosure.

FIG. 11 is a simplified block diagram of a device 1100 that is suitable for implementing embodiments of the present disclosure. The device 1100 may be provided to implement the communication device, for example the first device 410, 710, the second device 420, 720 and the third device 730 as shown in FIGS. 4 and 7. As shown, the device 1100 includes one or more processors 1110, one or more memories 1140 coupled to the processor 1110, and one or more transmitters and/or receivers (TX/RX) 1140 coupled to the processor 1110.

The TX/RX 1140 is for bidirectional communications. The TX/RX 1140 has at least one antenna to facilitate communication. The communication interface may represent any interface that is necessary for communication with other network elements.

The processor 1110 may be of any type suitable to the local technical network and may include one or more of the following: general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

The memory 1120 may include one or more non-volatile memories and one or more volatile memories. Examples of the non-volatile memories include, but are not limited to, a Read Only Memory (ROM) 1124, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 1122 and other volatile memories that will not last in the power-down duration.

A computer program 1130 includes computer executable instructions that are executed by the associated processor 1110. The program 1130 may be stored in the ROM 1120. The processor 1110 may perform any suitable actions and processing by loading the program 1130 into the RAM 1120.

The embodiments of the present disclosure may be implemented by means of the program 1130 so that the device 1100 may perform any process of the disclosure as discussed with reference to FIGS. 5, 6, 8 and 9. The embodiments of the present disclosure may also be implemented by hardware or by a combination of software and hardware.

Figure 12:
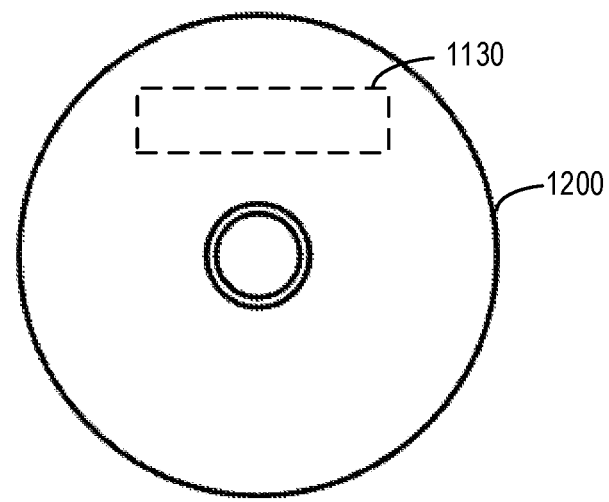
FIG. 12 shows a block diagram of an example computer readable medium in accordance with some embodiments of the present disclosure.

In some embodiments, the program 1130 may be tangibly contained in a computer readable medium which may be included in the device 1100 (such as in the memory 1120) or other storage devices that are accessible by the device 1100. The device 1100 may load the program 1130 from the computer readable medium to the RAM 1122 for execution. The computer readable medium may include any types of tangible non-volatile storage, such as ROM, EPROM, a flash memory, a hard disk, CD, DVD, and the like. FIG. 12 shows an example of the computer readable medium 1200 in form of CD or DVD. The computer readable medium has the program 1130 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 600 and 900 as described above with reference to FIGS. 6 and 9. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first device, comprising:
    at least one processor; and
    at least one memory including computer program code;
    the at least one memory and the computer program code being configured to, with the at least one processor, cause the first device to:
        receive, from a plurality of second devices, information about carrier sensing to be performed by the plurality of the second devices;
        determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and
        transmit a first message indicative of the transmission pattern to the target second device,
    wherein the information about the carrier sensing at least indicates a type and duration of the carrier sensing to be performed on an unlicensed band.

2. The first device of claim 1, wherein the information about the time sensitive traffic includes at least one of an arrival time, a packet delay budget, and a traffic priority of the time sensitive traffic.

3. A first device, comprising:
    at least one processor; and
    at least one memory including computer program code;
    the at least one memory and the computer program code being configured to, with the at least one processor, cause the first device to:
        receive, from a plurality of second devices, information about carrier sensing to be performed by the plurality of the second devices;
        determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and
        transmit a first message indicative of the transmission pattern to the target second device,
    wherein the first device is caused to determine the transmission pattern by:
        determining, based on the information about the carrier sensing and the information about the time sensitive traffic, the sensing period, the target second device having a highest priority, among the plurality of the second devices, for transmitting the time sensitive traffic during the sensing period; and
        determining at least one sensing period of the rest of the plurality of second devices to be the muting period of the target second device, the target second device being not allowed to transmit during the muting period.

4. A first device, comprising:
    at least one processor; and
    at least one memory including computer program code;
    the at least one memory and the computer program code being configured to, with the at least one processor, cause the first device to:
        receive, from a plurality of second devices, information about carrier sensing to be performed by the plurality of the second devices;

determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device;

transmit a first message indicative of the transmission pattern to the target second device, receive a second message from one of candidate devices controlled by the first device, the second message including information about at least one neighbor cell of the candidate device that interferes with the carrier sensing performed by the candidate device; and determine, from the candidate devices, the plurality of the second devices to be coordinated with the transmission pattern based on the information about the at least one neighbor cell, the information indicating an identity and an interference level of at least one neighboring candidate device of the candidate device that manages the at least one neighbor cell.

5. The first device of claim 4, wherein the first device is caused to determine the transmission pattern by:

determining, based on the information about the carrier sensing and the information about the time sensitive traffic, the sensing period, the target second device having a highest priority, among the plurality of the second devices, for transmitting the time sensitive traffic during the sensing period; and determining the muting period of the target second device based on the interference level of the target second device caused to the rest of the plurality of the second devices, the target second device not allowed to transmit during the muting period.

6. A first device, comprising:

at least one processor; and at least one memory including computer program code;

the at least one memory and the computer program code being configured to, with the at least one processor, cause the first device to:

receive, from a plurality of second devices, information about carrier sensing to be performed by the plurality of the second devices;

determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmit a first message indicative of the transmission pattern to the target second device, wherein the first device is further caused to determine the transmission pattern by:

determining transmission occasions outside the sensing periods and the muting periods to be a shared period, the plurality of the second devices transmitting non-time sensitive traffic in a contention-based manner during the shared period; and determining the transmission pattern to be including the at least one sensing period, the muting period and the shared period.

7. The first device of claim 1, wherein the first device is caused to transmit the first message by:

transmitting the first message including information at least indicating start times and durations of the at least sensing period and the muting period.

8. The first device of claim 1, wherein the sensing period of the target second device at least includes a listen-before-talk duration of the target second device.

9. The first device of claim 8, wherein the sensing period of the target second device further includes a transmission duration of the time sensitive traffic of the target second device.

10. A first device, comprising:

at least one processor; and at least one memory including computer program code;

the at least one memory and the computer program code being configured to, with the at least one processor, cause the first device to:

receive, from a plurality of second devices, information about carrier sensing to be performed by the plurality of the second devices;

determine a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmit a first message indicative of the transmission pattern to the target second device, wherein the muting period of the target second device includes sensing periods and transmission durations of the rest of the plurality of the second devices.

11. The first device of claim 1, wherein the information about time sensitive traffic is preconfigured at the first device.

12. The first device of claim 11, wherein the first device comprises a management device at a core network and configured with a session management function, and the plurality of the second devices comprise network devices.

13. The first device of claim 1, wherein the first device is further caused to:

obtain the information about time sensitive traffic from a management device at a core network, the management device being configured with a session management function.

14. The first device claim 13, wherein the first device comprises a central network device, and the plurality of the second devices comprise distributed network devices.

15. A method, comprising:

receiving, at a first device and from a plurality of second devices, information about carrier sensing to be performed by the plurality of the second devices;

determining a transmission pattern for a target second device of the plurality of the devices based on the information about the carrier sensing and information about time sensitive traffic of the plurality of the second devices, the transmission pattern including at least a sensing period for transmission of time sensitive traffic of the target second device and a muting period of the target second device; and transmitting a first message indicative of the transmission pattern to the target second device, wherein the information about the carrier sensing at least indicates a type and duration of the carrier sensing to be performed on an unlicensed band.

16. A non-transitory computer readable medium comprising program instructions encoded thereon which, when executed on an apparatus, cause the apparatus to perform at least the method of claim 15.

\* \* \* \* \*